US006703357B1

(12) United States Patent
Maurer et al.

(10) Patent No.: US 6,703,357 B1
(45) Date of Patent: Mar. 9, 2004

(54) CLEANING AGENT FOR HARD SURFACES, CONTAINING GLUCANASE

(75) Inventors: Karl-Heinz Maurer, Erkrath (DE); Christian Nitsch, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/463,864

(22) PCT Filed: Jul. 21, 1998

(86) PCT No.: PCT/EP98/04566

§ 371 (c)(1),
(2), (4) Date: May 4, 2000

(87) PCT Pub. No.: WO99/06515

PCT Pub. Date: Feb. 11, 1999

(30) Foreign Application Priority Data

Jul. 30, 1997 (DE) ........................................ 197 32 750

(51) Int. Cl.[7] ............................ C11D 3/00; C11D 7/42; C12S 9/00

(52) U.S. Cl. ...................... 510/392; 510/305; 510/300; 510/255; 510/276; 435/209

(58) Field of Search ................................ 510/392, 276, 510/255, 300, 305; 435/209

(56) References Cited

U.S. PATENT DOCUMENTS

| | | | | |
|---|---|---|---|---|
| 4,585,642 A | | 4/1986 | Rieck | 423/333 |
| 4,664,839 A | | 5/1987 | Rieck | 252/175 |
| 4,820,439 A | | 4/1989 | Rieck | 252/135 |
| 4,966,996 A | | 10/1990 | Schaefer et al. | 562/598 |
| 4,985,553 A | | 1/1991 | Fuertes et al. | 536/124 |
| 5,183,651 A | | 2/1993 | Schimmel et al. | 423/334 |
| 5,229,095 A | | 7/1993 | Schimmel et al. | 423/334 |
| 5,268,156 A | | 12/1993 | Schimmel et al. | 423/334 |
| 5,308,596 A | | 5/1994 | Kotzian et al. | 423/333 |
| 5,318,733 A | | 6/1994 | Carduck et al. | 264/15 |
| 5,382,377 A | | 1/1995 | Raehse et al. | 252/174 |
| 5,417,951 A | | 5/1995 | Just | 423/334 |
| 5,494,488 A | | 2/1996 | Arnoldi et al. | 8/137 |
| 5,541,316 A | | 7/1996 | Engelskirchen et al. | 510/471 |
| 5,580,941 A | | 12/1996 | Krause et al. | 527/300 |
| 5,616,550 A | | 4/1997 | Kruse et al. | 510/444 |
| 5,691,295 A | | 11/1997 | Maurer et al. | 510/392 |
| 5,783,616 A | | 7/1998 | Krause et al. | 524/58 |
| 5,798,328 A | | 8/1998 | Kottwitz et al. | 510/438 |
| 5,811,381 A | | 9/1998 | Emalfarb et al. | 510/320 |
| 5,830,956 A | | 11/1998 | Stockhauser et al. | 526/318.2 |
| 5,847,065 A | | 12/1998 | Krause et al. | 527/300 |
| 5,854,191 A | | 12/1998 | Krause et al. | 510/276 |
| 5,854,321 A | | 12/1998 | Krause et al. | 524/58 |
| 5,856,451 A | * | 1/1999 | Olsen et al. | 530/402 |
| 5,916,796 A | * | 6/1999 | Jorgensen et al. | 435/209 |
| 5,990,065 A | * | 11/1999 | Vinson et al. | 510/237 |

FOREIGN PATENT DOCUMENTS

| | | |
|---|---|---|
| CA | 1 036 455 | 8/1978 |
| DE | 24 12 837 | 10/1974 |
| DE | 226 012 | 8/1985 |
| DE | 39 21 839 | 1/1991 |
| DE | 42 21 381 | 2/1994 |
| DE | 43 00 772 | 7/1994 |
| DE | 43 03 320 | 11/1995 |
| DE | 44 16 438 | 11/1995 |
| DE | 44 17 734 | 11/1995 |
| DE | 44 43 177 | 6/1996 |
| DE | 195 29 905 | 2/1997 |
| DE | 195 36 082 | 4/1997 |
| DE | 196 05 688 | 8/1997 |
| DE | 196 13 103 | 10/1997 |
| DE | 196 20 411 | 10/1997 |
| DE | 196 16 693 | 11/1997 |

(List continued on next page.)

OTHER PUBLICATIONS

Industrielle Enzyme, Chapter11.5, (1990) pp. 728–757.
Anal. Biochem, 47, (1972) pp. 273–279.
Anal. Biochem, 81, (1977) pp. 21–27.
Derwent Patent Abstract (WPAT) No. 1998–000642[01].
Derwent Patent Abstract (WPAT) No. 1991–022947 [04].
Derwent Patent Abstract (WPAT) No. 1996–371180 [37].
Derwent Patent Abstract (WPAT) No. 1999–122161 [11].
Derwent Patent Abstract (WPAT) No. 1992–218091 [27 ].
Derwent Patent Abstract (WPAT) No. 1994–311135 [39].
Derwent Patent Abstract (WPAT) No. 1994–075443 [10].
Derwent Patent Abstract (WPAT) No. 1997–551016 [51].
Derwent Patent Abstract (WPAT) No. 1997–551018 [51].
Derwent Patent Abstract (WPAT) No. 1997–537244 [50].
Derwent Patent Abstract (WPAT) No. 1997–537245 [50].
Derwent Patent Abstract (WPAT) No. 1995–186717 [25].
Derwent Patent Abstract (WPAT) No. 1996–287166 [29].
Derwent Patent Abstract (WPAT) No. 1997–133790 [13].
Derwent Patent Abstract (WPAT) No. 1998–019669 [03].
Derwent Patent Abstract (WPAT) No. 1997–204334 [19].
Derwent Patent Abstract (WPAT) No. 1997–416938 [39].
Derwent Patent Abstract (WPAT) No. 1997–481969 [45].
Derwent Patent Abstract (WPAT) No. 1996–011551 [02].
Derwent Patent Abstract (WPAT) No. 1997–481903 [45 ].
Derwent Patent Abstract (WPAT) No. 1994–311135 [39].
Tenside 7 (1970) p. 125.
Applied & Environmental Microbiol. (1994), pp. 1213–1220.
Applied Microbiol Biotech 38 (1993), pp. 507–513.
Biochemica et Biophysica Acta, 384 (1975), pp. 477–483.
Gene 29 (1984), pp. 21–26.
Industrial Enzymes and Their Applications, Uhlig, Wiley 1998, pp. 96–101, 114–119.

*Primary Examiner*—Lorna M. Douyon
*Assistant Examiner*—Eisa B Elhilo
(74) *Attorney, Agent, or Firm*—Stephen D. Harper; Glenn E. J. Murphy

(57) ABSTRACT

Agents for cleaning hard surfaces, such as crockery, containing a β-glucanase and compatible cleaning constituents, and having good cleaning effect on polysaccharide stains.

17 Claims, No Drawings

FOREIGN PATENT DOCUMENTS

| | | |
|---|---|---|
| DE | 196 16 767 | 11/1997 |
| DE | 196 16 769 | 11/1997 |
| DE | 196 16 770 | 11/1997 |
| DE | 196 19 221 | 11/1997 |
| DE | 196 20 267 | 11/1997 |
| DE | 197 32 751 | 2/1999 |
| EP | 0 164 514 | 12/1985 |
| EP | 0 164 552 | 12/1985 |
| EP | 0 232 202 | 8/1987 |
| EP | 0 272 030 | 6/1988 |
| EP | 0 293 753 | 12/1988 |
| EP | 0 392 592 | 10/1990 |
| EP | 0 425 427 | 5/1991 |
| EP | 0 436 835 | 7/1991 |
| EP | 0 443 651 | 8/1991 |
| EP | 0 446 982 | 9/1991 |
| EP | 0 453 003 | 10/1991 |
| EP | 0 458 397 | 11/1991 |
| EP | 0 458 398 | 11/1991 |
| EP | 0 486 592 | 5/1992 |
| EP | 0 502 325 | 9/1992 |
| EP | 0 525 239 | 2/1993 |
| EP | 0 544 490 | 6/1993 |
| EP | 0 544 519 | 6/1993 |
| EP | 0 548 599 | 6/1993 |
| EP | 0 549 271 | 6/1993 |
| EP | 0 549 272 | 6/1993 |
| EP | 0 564 476 | 10/1993 |
| EP | 0 642 576 | 3/1995 |
| EP | 0 693 550 | 1/1996 |
| EP | 0 709 452 | 5/1996 |
| EP | 0 747 470 | 12/1996 |
| EP | 0 755 999 | 1/1997 |
| EP | 0 756 000 | 1/1997 |
| GB | 2 283 982 | 5/1995 |
| JP | 04/238809 | 8/1992 |
| JP | 04/260610 | 9/1992 |
| WO | WO91/02781 | 3/1991 |
| WO | WO91/02792 | 3/1991 |
| WO | WO91/08171 | 6/1991 |
| WO | WO92/06184 | 4/1992 |
| WO | WO92/18542 | 10/1992 |
| WO | WO92/21760 | 12/1992 |
| WO | WO93/16110 | 8/1993 |
| WO | WO94/02597 | 2/1994 |
| WO | WO94/02618 | 2/1994 |
| WO | WO94/05762 | 3/1994 |
| WO | WO94/18314 | 8/1994 |
| WO | WO94/23005 | 10/1994 |
| WO | WO94/23053 | 10/1994 |
| WO | WO94/27970 | 12/1994 |
| WO | WO94/28102 | 12/1994 |
| WO | WO94/28103 | 12/1994 |
| WO | WO95/00626 | 1/1995 |
| WO | WO95/07350 | 3/1995 |
| WO | WO95/14075 | 5/1995 |
| WO | WO95/14759 | 6/1995 |
| WO | WO95/17498 | 6/1995 |
| WO | WO95/22592 | 8/1995 |
| WO | WO95/23221 | 8/1995 |
| WO | WO95/27775 | 10/1995 |
| WO | WO 95/35362 | 12/1995 |
| WO | WO95/35362 | 12/1995 |
| WO | WO96/16153 | 5/1996 |
| WO | WO96/23579 | 8/1996 |
| WO | WO96/23859 | 8/1996 |
| WO | WO96/23860 | 8/1996 |
| WO | WO96/23861 | 8/1996 |
| WO | WO96/34108 | 10/1996 |
| WO | WO97/13862 | 4/1997 |
| WO | WO97/19155 | 5/1997 |

* cited by examiner

CLEANING AGENT FOR HARD SURFACES, CONTAINING GLUCANASE

BACKGROUND OF THE INVENTION

This invention relates to compositions for cleaning hard surfaces, more particularly tableware, which contain β-glucanase to improve their cleaning performance.

Enzymes, especially proteases, lipases and amylases, are widely used in laundry detergents, washing aids and dishwashing detergents. They are primarily used to remove protein, fatty and starch soils.

In connection with polysaccharide soils, there is the problem that naturally occurring polysaccharides, for example as present in foods, do not normally consist solely of starch, but also contain other saccharides or differently linked saccharides. Whereas α-amylases intended for use in dishwashing detergents are generally very suitable for hydrolyzing the starch component of polysaccharide soils into water-soluble oligosaccharides, their soil removal capacity can be unsatisfactory when the soils in question are soils of other polysaccharides or when these other polysaccharides make up relatively large parts of the polysaccharide soils. Thus, unrefined or low-refined cereals in particular, for example oat flakes, muesli, corn flakes or whole grain dough, contain relatively large amounts of glucans and lichenans which lead to obstinate soils on tableware which has come into contact with them.

The problem addressed by the present invention was to remedy this situation and to provide a composition suitable for cleaning hard surfaces, for example for cleaning tableware, particularly in dishwashing machines, which would have an improved cleaning performance with respect to polysaccharide soils.

DESCRIPTION OF THE INVENTION

The present invention, which is intended to solve the problem stated above, relates to a composition suitable for cleaning hard surfaces, particularly tableware, which contains a β-glucanase in addition to typical ingredients compatible with this enzyme.

β-Glucanases in the context of the present invention are enzymes from the class of endo-1,3-1,4-β-D-glucan-4-glucanohydrolases (EC 3.2.1.73; lichenases). β-Glucanases in the context of the invention also include endo-1,3-β-D-glucosidases (EC 3.2.1.39; laminarinases). β-Glu-canases cleave mixed glucans, which are linked alternately by 1,3- and 1,4-β-glucoside bonds, into oligosaccharides. Polymeric mixed glucans such as these are present in varying amounts in virtually all cereal products. Hitherto, enzymes capable of cleaving them have been used above all in the food, beverage and animal feed industry, in the textile industry and in the processing of starch (R. Borriss, "β-Glucan-spaltende Enzyme", in H. Ruttloff: "Industrielle Enzyme", Chapter 11.5, Behr's Verlag, Hamburg, 1994).

β-Glucanases suitable for use in accordance with the invention are obtainable from microorganisms, for example *Achromobacter lunatus, Athrobacter luteus, Aspergillus aculeatus, Aspergillus niger, Bacillus subtilis, Disporotrichum dimorphosporum, Humicola insolens, Penicillium emersonli, Penicillium funiculosum* or *Trichodenna reesei.* A commercial product is marketed, for example, under the name of Cereflo® (manufacturer: Novo Nordisk A/S). Preferred β-Glucanases include an enzyme obtainable from *Bacillus alkalophilus* (DSM 9956) which is the subject of hitherto unpublished German patent application DE 197 32 751.

β-Glucanase is preferably incorporated in compositions according to the invention in such quantities that they have glucanolytic activities of 0.05 U/g to 1 U/g and more particularly in the range from 0.06 U/g to 0.25 U/g. The determination of the glucanolytic activity is based on modifications of the process described by M. Lever in Anal. Biochem. 47 (1972), 273–279 and Anal Biochem. 81 (1977), 21–27. A 0.5% by weight solution of β-glucan (Sigma No. G6513) in 50 mM glycine buffer (pH 9.0) is used for this purpose. 250 μl of this solution are added to 250 μl of a solution containing the agent to be tested for glucanolytic activity and incubated for 30 minutes at 40° C. 1.5 ml of a 1% by weight solution of p-hydroxybenzoic acid hydrazide (PAHBAH) in 0.5 M NaOH, which contains 1 mM bismuth nitrate and 1 mM potassium sodium tartrate, are then added, after which the solution is heated for 10 minutes to 70° C. After cooling (2 minutes/0° C.), the absorption at 410 nm is determined against a blank value at room temperature (for example with a Uvikon® 930 photometer) using a glucose calibration curve. The blank value is a solution which is prepared in the same way as the measuring solution except that the glucan solution is added after the PAHBAH solution. 1 U corresponds to the quantity of enzyme which produces 1 μmole of glucose per minute under these conditions.

The present invention also relates to the use of β-glucanase for removing polysaccharide soils from hard surfaces, particularly tableware, and to a process for removing polysaccharide soils from hard surfaces, particularly tableware, by using β-glucanase. For the use according to the invention and for the process according to the invention, the β-glucanase may be applied to polysaccharide-soiled tableware either on its own or as part of a pretreatment composition in the course of a pretreatment step preceding the dishwashing process. However, the β-glucanase is preferably used as part of an aqueous cleaning solution which may additionally contain typical ingredients of cleaning or dishwashing liquors. Glucanolytic activities of 0.1 U/l to 6 U/l and, more particularly, 0.15 U/l to 1.5 U/l in the aqueous cleaning solution are preferred. In manual or more particularly machine dishwashing processes, for example in routine domestic washing-up using dishwashing machines, the glucanolytic activities mentioned do not have to be maintained over the entire washing cycle to achieve the required washing result providing it is guaranteed that a glucanolytic activity in the range mentioned prevails for at least a short time, for example for about 1 to 20 minutes and more particularly 5 to 15 minutes.

β-Glucanase may be adsorbed onto supports and/or encapsulated in shell-forming substances to protect it against premature inactivation, particularly where it is used in particulate compositions as described, for example, in European patent EP 0 564 476 or in International patent applications WO 94123005 for other enzymes.

Since the cleaning performance of amylolytic and β-glucanolytic enzymes, especially in dishwashing detergents, is unexpectedly increased when they are used in combination, a composition according to the invention preferably contains at least one amylase in addition to β-glucanase. A composition according to the invention is distinguished in particular by an amylolytic activity of about 0.5 U/g to about 3 U/g and, more particularly, in the range from about 1 U/g to about 2 U/g. The amylase activity is determined by a method similar to the standardarized method described above for the glucanase activity using soluble starch instead of glucan.

Besides the β-glucanase used in accordance with the invention, the compositions according to the invention— which may be present as granules, powder-form or tablet-form solids, as homogeneous solutions or suspensions—may in principle contain any known ingredients typically encountered in such compositions. More particularly, the detergents according to the invention may contain builders, surfactants, bleaching agents based on organic and/or inorganic peroxygen compounds, bleach activators, water-miscible organic solvents, additional enzymes, sequestering agents, electrolytes, pH regulators and/or other auxiliaries, such as silver corrosion inhibitors, foam regulators and dyes and perfumes.

In addition, a composition according to the invention for cleaning hard surfaces may contain abrasive ingredients, more especially from the group consisting of silica flours, wood flours, polymer powders, chalks and glass microbeads and mixtures thereof. Abrasives are present in the compositions according to the invention in quantities of preferably not more than 20% by weight and, more particularly, in quantities of 5% by weight to 15% by weight.

In principle, the water-soluble builder component of compositions according to the invention may be selected from any of the builders typically used in machine dishwashing detergents, for example alkali metal phosphates which may be present in the form of their alkaline, neutral or acidic sodium or potassium salts. Examples of such alkali metal phosphates are trisodium phosphate, tetrasodium diphosphate, disodium dihydrogen diphosphate, pentasodium triphosphate, so-called sodium hexametaphosphate, oligomeric trisodium phosphate with degrees of oligomerization of 5 to 1,000 and, more particularly, 5 to 50 and the corresponding potassium salts and mixtures of sodium and potassium salts. They may be present in quantities of up to about 60% by weight and preferably between 5% by weight and 20% by weight, based on the detergent as a whole. Other possible water-soluble builder components besides polyphosphonic acids and phosphonatoalkyl carboxylates are, for example, organic polymers of native or synthetic origin of the polycarboxylate type which act as co-builders, particularly in hard water areas. Examples of builders such as these are polyacrylic acids and copolymers of maleic anhydride and acrylic acid and the sodium salts of these polymeric acids. Commercially available products are, for example, Sokalan® CP 5, CP 10 and PA 30 (BASF). The polymers of native origin suitable as co-builders include, for example, the oxidized starches known, for example, from International patent application WO 94/05762 and polyamino acids, such as polyglutamic acid or polyaspartic acid. Other possible builder components are naturally occurring hydroxycarboxylic acids such as, for example, mono- and dihydroxysuccinic acid, □-hydroxypropionic acid and gluconic acid. Preferred organic builder components are the salts of citric acid, more especially sodium citrate. The sodium citrate used may be anhydrous sodium citrate and is preferably trisodium citrate dihydrate. Trisodium citrate dihydrate may be used as a fine or coarse crystalline powder. The acids corresponding to the co-builder salts mentioned may also be present, depending on the pH value ultimately established in the detergents according to the invention.

In one preferred embodiment, a machine dishwashing detergent according to the invention contains the usual alkali carriers, for example alkali metal silicates, alkali metal carbonates and/or alkali metal hydrogen carbonates. The alkali carriers normally used include carbonates, hydrogen carbonates and alkali metal silicates with a molar $SiO_2$:$M_2O$ ratio (M=alkali metal atom) of 1:1 to 2.5:1. Alkali metal silicates may be present in quantities of up to 40% by weight, based on the detergent as a whole. However, the highly alkaline metasilicates are preferably not used at all as alkali carriers. The alkali carrier system preferably used in the compositions according to the invention is a mixture of carbonate and hydrogen carbonate, preferably sodium carbonate and hydrogen carbonate, which is present in a quantity of up to 50% by weight and preferably in quantity of 5% by weight to 40% by weight. The ratio of carbonate used to hydrogen carbonate used varies according to the pH value ultimately required.

Another embodiment of compositions according to the invention contains 20% by weight to 60% by weight of water-soluble organic builder, more particularly alkali metal citrate, 3% by weight to 20% by weight of alkali metal carbonate and 5% by weight to 40% by weight of alkali metal disilicate.

Suitable peroxygen compounds are, in particular, organic peracids or peracidic salts of organic acids, such as phthalimidopercaproic acid, perbenzoic acid or salts of diperdodecane diacid, hydrogen peroxide and inorganic salts which release hydrogen peroxide under the washing conditions, such as perborate, percarbonate and/or persilicate. Hydrogen peroxide can also be produced by an enzyme system, i.e. an oxidase and its substrate. If solid peroxygen compounds are to be used, they may be used in the form of powders or granules which may also be coated in known manner. In a particularly preferred embodiment, alkali metal percarbonate, alkali metal perborate monohydrate, alkali metal perborate tetrahydrate or hydrogen peroxide is used in the form of an aqueous solution containing 3% by weight to 10% by weight of hydrogen peroxide. If a detergent according to the invention contains peroxygen compounds, the peroxygen compounds are present in quantities of preferably up to 50% by weight and, more preferably, 5% by weight to 30% by weight. The addition of small quantities of known bleach stabilizers, for example phosphonates, borates or metaborates and metasilicates and magnesium salts, such as magnesium sulfate, can be useful.

The bleach activators may be compounds which form aliphatic peroxocarboxylic acids containing preferably 1 to 10 carbon atoms and more preferably 2 to 4 carbon atoms and/or optionally substituted perbenzoic acid under perhydrolysis conditions. Substances bearing O- and/or N-acyl groups with the number of carbon atoms mentioned and/or optionally substituted benzoyl groups are suitable. Preferred bleach activators are polyacylated alkylenediamines, more particularly tetraacetyl ethylenediamine (TAED), acylated triazine derivatives, more particularly 1,5-diacetyl-2,4-dioxohexahydro-1,3,5-triazine (DADHT), acylated glycolurils, more particularly tetraacetyl glycoluril (TAGU), N-acylimides, more particularly N-nonanoyl succinimide (NOSI), acylated phenol sulfonates, more particularly n-nonanoyl or isononanoyloxybenzenesulfonate (n- or iso-NOBS), carboxylic anhydrides, more particularly phthalic anhydride, acylated polyhydric alcohols, more particularly triacetin, ethylene glycol diacetate, 2,5-diacetoxy-2,5-dihydrofuran and the enol esters known from German patent applications DE 196 16 693 and DE 196 16 767, acetylated sorbitol and mannitol and the mixtures thereof (SORMAN) described in European patent application EP 0 525 239, acylated sugar derivatives, more particularly pentaacetyl glucose (PAG), pentaacetyl fructose, tetraacetyl xylose and octaacetyl lactose, and acetylated, optionally N-alkylated glucamine and gluconolactone, and/or N-acylated lactams, for example N-benzoyl caprolactam, which are known from International patent applications WO 94/27970, WO 94128102, WO 94/28103, WO 95/00626, WO 95/14759 and WO 95/17498. The substituted hydrophilic acyl acetals known from German patent application DE 196 16 769 and the acyl lactams described in German patent application DE 196 16 770 and in International patent application WO 95/14075 are also preferably used. The combinations of conventional bleach activators known from German patent application DE 44 43 177 may also be used. Bleach activators such as these are present in the usual quantities, preferably in quantities of 1% by weight to 10% by weight and more preferably in quantities of 2% by weight to 8% by weight, based on the detergent as a whole.

In addition to or instead of the conventional bleach activators mentioned above, the sulfonimines known from European patents EP 0 446 982 and EP 0 453 003 and/or bleach-boosting transition metal salts or transition metal complexes may also be present as so-called bleach catalysts. Suitable transition metal compounds include, in particular, the manganese-, iron-, cobalt-, ruthenium- or molybdenum-salen complexes known from German patent application DE 195 29 905 and the N-analog compounds thereof known from German patent application DE 196 20 267, the manganese-, iron-, cobalt-, ruthenium- or molybdenum-carbonyl complexes known from German patent application DE 195 36 082, the manganese, iron, cobalt, ruthenium, molybdenum, titanium, vanadium and copper complexes with nitrogen-containing tripod ligands described in German patent application DE 196 05 688, the cobalt-, iron-, copper- and ruthenium-amine complexes known from German patent application DE 196 20 411, the manganese, copper and cobalt complexes described in German patent application DE 44 16 438, the cobalt complexes described in European patent application EP 0 272 030, the manganese complexes known from European patent application EP 0 693 550, the manganese, iron, cobalt and copper complexes known from European patent EP 0 392 592, the cobalt complexes known from International patent applications WO 96/23859, WO 96/23860 and 96/23861 and/or the manganese complexes described in European patent EP 0 443 651 or in European patent applications EP 0 458 397, EP 0 458 398, EP 0 549 271, EP 0 549 272, EP 0 544 490 and EP 0 544 519. Combinations of bleach activators and transition metal bleach catalysts are known, for example, from German patent application DE 196 13 103 and from international patent application WO 95/27775. Bleach-boosting transition metal complexes, more particularly with the central atoms Mn, Fe, Co. Cu, Mo, V, Ti and/or Ru, are used in typical quantities, preferably in a quantity of up to 1% by weight, more preferably in a quantity of 0.0025% by weight to 0.25% by weight and most preferably in a quantity of 0.01% by weight to 0.1% by weight, based on the detergent as a whole.

Surfactants, more especially low-foaming nonionic surfactants, optionally in admixture with anionic and/or zwitterionic surfactants, may also be added to the compositions according to the invention to improve the removal of fatty-containing soils, as wetting agents and optionally as granulation aids in the production of the detergents. They may be added in quantities of up to 10% by weight, preferably in quantities of up to 5% by weight and more preferably in quantities of 0.5% by weight to 3% by weight. Extremely low-foaming compounds are normally used, especially in machine dishwashing detergents. Such compounds are preferably $C_{12-18}$ alkyl polyethylene glycol polypropylene glycol ethers containing up to 8 moles of ethylene oxide units and up to 8 moles of propylene oxide units in the molecule. However, other known low-foaming nonionic surfactants may also be used, including for example $C_{12-18}$ alkyl polyethylene glycol polybutylene glycol ethers containing up to 8 moles of ethylene oxide units and up to 8 moles of butylene oxide units in the molecule, end-capped alkyl polyalkylene glycol mixed ethers and the foaming, but ecologically attractive $C_{8-14}$ alkyl polyglucosides with a degree of polymerization of about 1 to 4 (for example APG® 225 and APG® 600 of Henkel KGaA) and/or $C_{12-14}$ alkyl polyethylene glycols containing 3 to 8 ethylene oxide units in the molecule. Surfactants from the glucamide family, for example alkyl-N-methyl glucamides in which the alkyl moiety preferably emanates from a $C_{6-14}$ fatty alcohol, are also suitable. In some case, the described surfactants may also be advantageously used in the form of mixtures, for example in the form of a mixture of alkyl polyglycoside with fatty alcohol ethoxylates or a mixture of glucamide with alkyl polyglycosides. Suitable anionic surfactants are, in particular, soaps and those which contain sulfate or sulfonate groups with, preferably, alkali metal ions as cations. Suitable soaps are preferably the alkali metal salts of saturated or unsaturated fatty acids containing 12 to 18 carbon atoms. Fatty acids such as these may also be used in non-completely neutralized form. Suitable surfactants of the sulfate type include the salts of sulfuric acid semiesters of fatty alcohols containing 12 to 18 carbon atoms and sulfation products of the nonionic surfactants mentioned with a low degree of ethoxylation. Suitable surfactants of the sulfonate type include linear alkyl benzenesulfonates containing 9 to 14 carbon atoms in the alkyl moiety, alkanesulfonates containing 12 to 18 carbon atoms and olefin sulfonates containing 12 to 18 carbon atoms, which are formed in the reaction of corresponding monoolefins with sulfur trioxide, and α-sulfofatty acid esters which are formed in the sulfonation of fatty acid methyl or ethyl esters.

Enzymes suitable for use in the compositions besides the β-glucanase crucial to the invention and the oxidase mentioned above are those from the class of proteases, lipases, cutinases, amylases, pullulanases and peroxidases and mixtures thereof, for example proteases, such as BLAP®, Optimase®, Opticlean®, Maxacal®, Maxapem®, Alcalase®, Esperase®, Savinase®, Durazym® and/or Purafect® OxP; amylases, such as Termamyl®, Amylase-LT®D, Maxamyl®, Duramyl® and/or Purafect®OxAm; lipases, such as Lipolase®, Lipomax®, Lumafast® and/or Lipozym®. Enzymes obtained from fungi or bacteria, such as *Bacillus subtilis, Bacillus licheniformnis, Streptomyces griseus, Humicola lanuginosa, Humicola insolens, Pseudomonas peudoalcaligenes* or *Pseudomonas cepacia* are particularly suitable. The additional enzymes optionally used may also be adsorbed to supports and/or embedded in shell-forming materials for protection against premature inactivation, for example as described in European patent 0 564 476 or in International patent application WO 94/23005. They are present in the compositions according to the invention in quantities of preferably up to 10% by weight and, more preferably, from 0.05% by weight to 5% by weight, enzymes stabilized against oxidative degradation, as known for example from International patent applications WO 94102597, WO 94/02618, WO 94/18314, WO 94/23053 or WO 95/07350, being particularly preferred. Proteases preferably used in compositions according to the invention include the enzymes known from International patent applications WO 91/02792, WO 92/21760 and WO 95/23221.

Silver corrosion inhibitors may be used in dishwashing detergents according to the invention to protect silverware against corrosion. Preferred silver corrosion inhibitors are organic sulfides, such as cystine and cysteine, dihydric or trihydric phenols, optionally alkyl- or aryl-substituted triazoles, such as benzotriazole, isocyanuric acid, manganese, titanium, zirconium, hafnium, cobalt or cerium salts and/or complexes in which the metals mentioned have the oxidation number II, III, IV, V or VI, depending on the metal.

If the compositions foam too vigorously in use, for example where anionic surfactants are present, preferably up to 6% by weight and more preferably about 0.5% by weight to 4% by weight of a foam-suppressing compound, preferably from the group of silicone oils, mixtures of silicone oil and hydrophobicized silica, paraffins, paraffin/alcohol combinations, hydrophobicized silica, bis-fatty acid amides and other known commercially available defoamers, may be added to them. Other optional ingredients in the detergents according to the invention are, for example, perfume oils.

The organic solvents suitable for use in the compositions according to the invention, particularly where they are present in liquid or paste-like form, include $C_{1-4}$ alcohols, more especially methanol, ethanol, isopropanol and tert. butanol, $C_{2-4}$ diols, more especially ethylene glycol and propylene glycol, and mixtures thereof and ethers derived from the classes of compound mentioned. Water-miscible solvents such as these are present in the compositions according to the invention in quantities of preferably not more than 20% by weight and, more preferably, between 1% by weight and 15% by weight.

To establish a desired pH value which is not spontaneously adjusted by the mixture of the other components, the compositions according to the invention may contain system-compatible and environmentally compatible acids, more particularly citric acid, acetic acid, tartaric acid, malic acid, lactic acid, glycolic acid, succinic acid, glutaric acid and/or adipic acid and also mineral acids, more especially sulfuric acid, or alkli metal hydrogen sulfates, or bases, more especially ammonium or alkali metal hydroxides. pH regulators such as these are present in the compositions according to the invention in quantities of preferably not more than 10% by weight and, more preferably, between 0.5% by weight and 6% by weight.

In one preferred embodiment, dishwashing detergents according to the invention contain 30 to 60% by weight of sodium phosphate, 5% by weight to 25% by weight of sodium carbonate or a mixture thereof with polymeric polycarboxylate, 5% by weight to 15% by weight of sodium perborate or percarbonate, 0.5% by weight to 7% by weight of a bleach activator which releases peroxocarboxylic acid under perhydrolysis conditions, 0.5% by weight to 7.5% by weight of surfactant, 2% by weight to 30% by weight of sodium silicate and 0.1% by weight to 2% by weight of silver corrosion inhibitor, more particularly benzotriazole or a benzotriazole derivative.

Compositions according to the invention in the form of aqueous solutions or other solutions containing typical solvents are prepared with particular advantage simply by mixing the ingredients which may be introduced into an automatic mixer either as such or in the form of a solution.

The compositions according to the invention are preferably present as powder-form, granular or tablet-form preparations which may be produced by methods known per se, for example by mixing, granulating, roller compacting and/or spray drying the heat-resistant components and subsequently adding the more sensitive components, including in particular enzymes and optionally bleaching agents.

To produce compositions according to the invention in the form of tablets, all the ingredients are preferably mixed together in a mixer and the resulting mixture is tabletted under pressures of $200 \cdot 10^5$ Pa to $1500 \cdot 10^5$ Pa in conventional tablet presses, for example eccentric presses or rotary presses. Fracture-resistant tablets which still dissolve sufficiently quickly under in-use conditions and which have flexural strengths of normally above 150 N are readily obtained in this way. A tablet thus produced preferably weighs between 15 g and 40 g and more preferably between 20 g and 30 g for a diameter of 35 mm to 40 mm.

Compositions according to the invention in the form of storage-stable free-flowing powders and/or granules with high bulk densities of 800 to 1000 g/l, which do not emit any dust, can be produced by mixing the builder components with at least part of the liquid components in a first process step where the bulk density of this premix is increased and subsequently combining the other ingredients of the composition, including the bleach catalyst, with the premix thus obtained, if desired after intermediate drying.

Dishwashing compositions according to the invention may be used both in domestic dishwashing machines and in institutional dishwashing machines. They are added either by hand or by means of suitable dispensers. The in-use concentrations in the wash liquor are generally of the order of 1 to 8 g/l and preferably in the range from 2 to 5 g/l.

A machine dishwashing program is generally augmented and terminated by a few rinse cycles with clear water after the main wash cycle and a final rinse with a conventional rinse aid. After drying, completely clean and hygienically satisfactory tableware is obtained using compositions according to the invention.

EXAMPLES

A machine dishwashing detergent (C1) containing 45 parts by weight of sodium citrate, 5 parts by weight of sodium carbonate, 31 parts by weight of sodium hydrogen carbonate, 1 part by weight of protease granules and 2 parts by weight of amylase granules (Termamyl® 60 T), 2 parts by weight of nonionic surfactant and 10 parts by weight of sodium perborate monohydrate and 4 parts by weight of N,N,N',N'-tetraacetyl ethy-lenediamine (TAED), a composition according to the invention (M1) which had the same composition as C1, but additionally contained 1.7 parts by weight of Cereflo® 200 L, and another composition according to the invention (M2) which, instead of Cereflo® 200 L, contained twice the activity of β-glucanase from *Bacillus alkalophilus* (DSM 9956) were tested as follows:

Four plates soiled with standardized oat flake soils were washed in a Miele® G 575 dishwashing machine (doses of 25 g of each of the detergents to be tested in the universal program, water hardness 14–16° dH, operating temperature 55° C.) and the removal of the soils (after coloring by the iodine/starch reaction) was visually evaluated on a scale of 0 (=unchanged, very heavy soiling) to 10 (=no visible soil). The scores awarded to detergents M1 and M2 according to the invention as shown in the following Table are significantly better than the score awarded to the comparison detergent C1.

TABLE 1

Scores for cleaning performance

| Detergent | Cleaning performance |
|---|---|
| M1 | 8.3 |
| M2 | 7.5 |
| C1 | 6.5 |

It can be seen that the composition according to the invention is significantly superior in its cleaning performance to the comparison composition.

What is claimed is:

1. A hard surface cleaner comprising a β-glucanase derived from *Bacillus alkalophilus* DSM 9956, said cleaner having a glucanolytic activity of 0.05 U/g to 1 U/g.

2. The hard surface cleaner of claim 1, having a glucanolytic activity of 0.06 U/g to 0.5 U/g.

3. The hard surface cleaner of claim 1, further comprising an amylase.

4. The hard surface cleaner of claim 3, having an amylolytic activity of 0.5 U/g to 3 U/g.

5. The hard surface cleaner of claim 4, having an amylolytic activity of 1 U/g to 2 U/g.

6. A dishwashing detergent composition comprising a β-glucanase derived from *Bacillus alkalophilus* DSM 9956, 20% to 60% by weight of a water soluble organic builder, 3% to 20% by weight of an alkali metal carbonate, and 5% to 40% by weight of an alkali metal disilicate, the composition having a glucanolytic activity of 0.05 U/g to 1 U/g.

7. The composition of claim 6, wherein the water soluble organic builder is an alkali metal citrate.

8. The composition of claim 6, having a glucanolytic activity of 0.06 U/g to 0.5 U/g.

9. The composition of claim 6, further comprising an amylase.

10. The composition of claim 9, having an amylolytic activity of 0.5 U/g to 3 U/g.

11. The composition of claim 10, having an amylolytic activity of 1 U/g to 2 U/g.

12. A dishwashing detergent composition comprising a β-glucanase derived from *Bacillus alkalophilus* DSM 9956, 30% to 60% by weight of sodium phosphate, 5% to 25% by weight of sodium carbonate or a mixture thereof with a polymeric polycarboxylate, 5% to 15% by weight of sodium perborate, sodium percarbonate, or a mixture thereof, 0.5% by weight of a surfactant, 2% to 30% by weight of sodium silicate, and 0.1% to 2% by weight of a silver corrosion inhibitor, the composition having a glucanolytic activity of 0.05 U/g to 2 U/g.

13. The composition of claim 12, wherein the silver corrosion inhibitior is a benzotriazole or a derivative thereof.

14. The composition of claim 12, having a glucanolytic activity of 0.06 U/g to 0.5 U/g.

15. The composition of claim 12, further comprising an amylase.

16. The composition of claim 15, having an amylolytic activity of 0.5 U/g to 3 U/g.

17. The composition of claim 16, having an amylolytic activity of 1 U/g to 2 U/g.

* * * * *

UNITED STATES PATENT AND TRADEMARK OFFICE

CERTIFICATE OF CORRECTION

PATENT NO. : 6,703,357 B1
DATED : March 9, 2004
INVENTOR(S) : Maurer et al.

It is certified that error appears in the above-identified patent and that said Letters Patent is hereby corrected as shown below:

Column 8,
Line 65, insert -- a builder and -- after the word "comprising".

Column 10,
Line 6, insert -- to 7% by weight of a bleach activator, 0.5% to 7.5% -- after "0.5%".

Signed and Sealed this

Twentieth Day of July, 2004

JON W. DUDAS
*Acting Director of the United States Patent and Trademark Office*